April 12, 1927.
E. A. NELSON
1,624,356
LIFTING LEVER FOR DISK WHEELS
Original Filed Aug. 29, 1924
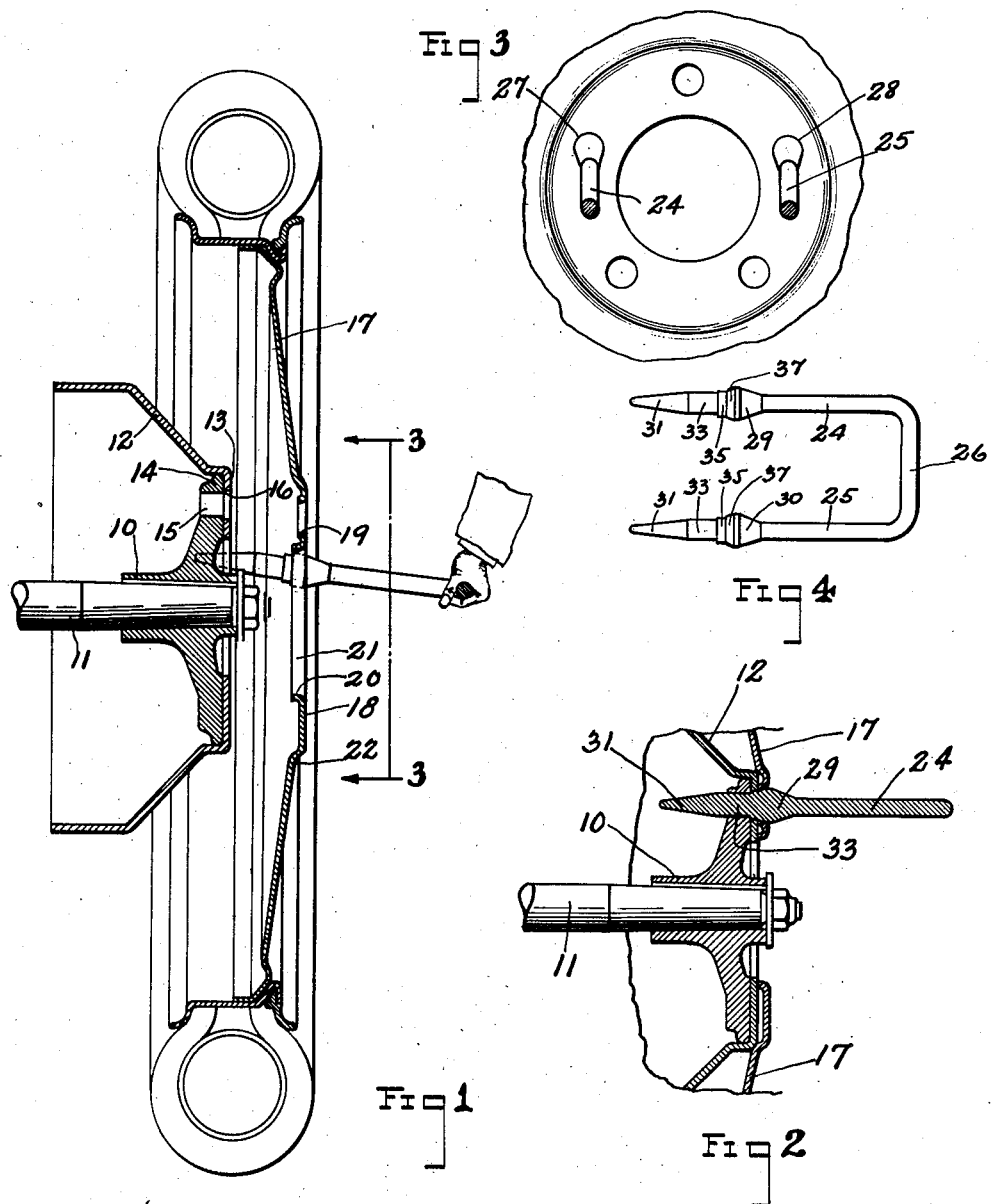
INVENTOR.
Emil A. Nelson
BY John P. Jarboe
ATTORNEY.

Patented Apr. 12, 1927.

1,624,356

UNITED STATES PATENT OFFICE.

EMIL A. NELSON, OF ABINGTON, PENNSYLVANIA, ASSIGNOR TO BUDD WHEEL COMPANY, OF PHILADELPHIA, PENNSYLVANIA, A CORPORATION OF PENNSYLVANIA.

LIFTING LEVER FOR DISK WHEELS.

Application filed August 29, 1924, Serial No. 734,835. Renewed February 10, 1927.

This invention relates to a wheel mounting device and, more particularly, to a lifting and locating device for disk wheels of the type in which the wheel is secured on the hub by means of removable bolts or screws inserted through spaced openings in the disk of the wheel and secured in similarly spaced openings in the hub aligned therewith.

In mounting wheels of this type on their hubs, the axle of the vehicle, and the hub mounted thereon, is lifted, by means of a jack or equivalent device, to a height slightly above that corresponding to its normal position when the wheel is mounted. The wheel must then be lifted from the ground until its bolt holes are in alignment with the corresponding openings of the hub and the securing bolts or studs fitted into and secured in the openings. As the wheels are somewhat heavy and cumbersome and difficult to handle, the alignment of the bolt openings and the attachment of the wheel may prove difficult.

An object of my present invention is to provide a device by which a wheel may be readily and easily lifted to its proper position with openings in the hub.

Other objects of the invention are to provide a lifting and locating device for wheels by which, as the wheel is lifted into position, the attachment openings are automatically brought into proper alignment and by which the wheel may be easily held in aligned position while the attaching screws or studs are being inserted and certain of them screwed or otherwise secured in place.

Further objects, and objects relating to details and economies of construction and operation, will definitely appear from the detailed description to follow. In one instance, I have accomplished the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a vertical sectional view of a hub, a disk wheel and a lifting and locating lever therefor, embodying a form of my present invention, the section being taken on a vertical diameter of the wheel and hub, and the wheel being shown in a partly lifted position with the lever device in use.

Fig. 2 is a similar sectional view of a portion of the hub, wheel, and lifting and locating lever, taken on the line 2—2 of Fig. 3, showing the position of these members as the wheel is in position to be secured to the hub.

Fig. 3 is a side view of a portion of the wheel and a section of the lifting and locating lever, taken on the line 3—3 of Fig. 1, and, Fig. 4 is a plan view of the lifting and locating lever.

In the drawings, the same reference numerals refer to the same parts throughout the several views, and the sectional views are taken looking in the direction of the arrows at the ends of the section lines.

In the embodiment illustrated in the accompanying drawings, the invention is shown in connection with a hub, 10, mounted on an axle, 11, in any suitable manner, and having a radially extending flange, 14, to which, in the case of a rear wheel, a brake drum, 12, may be secured. The flange, 14, of the hub is provided with a series of spaced, threaded openings, 15, five being shown by way of example, and the portion, 13, of the brake drum has corresponding, slightly larger, aligned openings, 16, through which the attaching studs may be inserted to secure a disk wheel, 17, on the hub tightly against the flange, 14.

For this purpose, the wheel, 17, is provided with a central rib portion, 18, adapted to rest against the portion, 13, of the brake drum, 12, or against the flange, 14, when no brake drum is used, and this portion, 18, is provided with a number of concave seats or sockets perforated at, 19, and spaced to align with the openings, 15, of the hub member, 10. The wheel is detachably secured upon the hub by means of studs (not shown) which extend through the holes, 19, of the disk and screw into the threaded holes, 15, of the hub flange, 14. In this instance, the studs are provided with convex shoulders fitting the concave seats or sockets in which the holes, 19, are formed.

It will be obvious that, when any two of the openings of the wheel are aligned with the respective openings in the hub member, the remaining openings of the wheel will be in alignment with their respective hub openings. In lifting the wheel into operative position with respect to the hub member, the present invention serves to bring two of the wheel openings into alignment with their respective hub openings so that the securing screws may be readily inserted and screwed into the remaining openings of the wheel and hub.

For this purpose, the lifting and locating device is provided with a pair of spaced parallel arms, 24 and 25, rigidly mounted in position with respect to a yoke member, 26, the axial centers of the arms being spaced apart at a distance equal to the distance between centers of two of the openings, 19, of the wheel. When five openings are employed, the distance between any two non-consecutive or non-adjacent openings, such as those indicated at 27 and 28 of Fig. 3, is preferably selected. The lifting and locating device has the parallel arms, 24 and 25, each terminating in the tapered portions, 31. In front of said tapered portions, the arms have the cylindrical portions, 33, of a diameter to fit in the openings, 15, of the hub flange, 14. In front of such cylindrical portions, the arms may have the slightly larger cylindrical portions, 35, of a size to fit in the openings, 19, of the disk wheel. In front of the portions, 35, of the arms are the convex shoulders, 37, which fit the concave sockets of the disk through which the openings, 19, are formed. When the wheel is to be lifted and located on its hub, it is preferably rolled to a position in which two of the openings, 19, lie in or substantially in a common horizontal plane. The arms, 24 and 25, of the lifting and locating tool are then inserted through the openings, 19, until the shoulders, 37, seat in the corresponding sockets of the disk. It will be observed that the free ends of the arms project considerably on the inner side of the disk. The operator grasps the yoke or cross bar, 26, with one hand and, steadying the wheel, if need be, with the other hand, lifts the wheels into alignment with the hub. The free ends of the arms are then inserted into the two openings, 15, of the hub flange aligned therewith and, since the cylindrical portions, 33, fit the holes, 15, (being of the same general form as the fastening means to be used), the disk, 17, is supported in operative position on the hub by the mounting tool. The tapered portions, 31, facilitate the entering of the ends of the arms of the mounting tool into the openings of the disk and hub. While the disk is supported in operative position on the hub by the mounting tool, the securing studs may be inserted and screwed into the unoccupied openings of disk and hub after which the mounting tool may be removed and the securing studs inserted and screwed into the openings formerly occupied by the arms of the mounting tool. Thus, the objects of the invention are realized. The tapered ends not only enable the pilot bar to be easily entered in the apertures in the demounted wheel, but also easily entered in the registering apertures in the hub itself. The enlarged sections of the levers prevent the wheel, while being raised, from sliding down the levers and mashing the hand of the operator; the yoke construction not only enables the operator to get a convenient and firm grip on the tool but, by the transverse leverage it affords, enables him to keep the wheel and the hub steady, and the fact that the engaging ends of the levers are of the same surface configuration as the fastening means to be used guarantees perfect alignment when the tool and the wheel which it carries are forced home upon the hub.

Some of these advantages can be secured when but one lever is used instead of the yoke-connected pair of levers, and I desire to be understood that I may so embody my invention though I prefer, because of the completeness of the results secured, to embody it in the form shown. The tool is subject to considerable modification without departing in any manner from the generic spirit of the invention to the end of adapting it for use in connection with wheels having different types of hub and wheel fastening means, hub and wheel apertures, etc., and even to adapting it to use where pilot bar coacts with bearings other than the bearings of the fastening means. I desire that all matter contained in the above description, or shown in the accompanying drawings, shall be interpreted as illustrative and not in a limiting sense.

Having thus described my invention, what I claim as new and useful and desire to secure by Letters Patent is:

1. A device of the type described comprising a lifting tool having a pair of spaced substantially parallel arms adapted to be inserted through spaced openings of a wheel and a hub member, and a yoke portion rigidly connecting said arms.

2. A device of the type described comprising a lifting tool having a pair of spaced substantially parallel arms adapted to be inserted through spaced openings of a wheel and a hub member, and a yoke portion rigidly connecting said arms, one of said arms at least having a shoulder adapted to abut against the edges of the openings of said wheel.

3. A device of the type described comprising a pair of spaced substantially parallel arms adapted to be inserted through spaced openings of a wheel and a hub member, and a yoke portion connecting said arms, said arms being of equal length and each arm having a shoulder adapted to abut the edge of the opening of the wheel through which the arm is inserted, said shoulders being at equal distances from the free ends of their arms.

4. A device of the type described comprising a pair of spaced substantially parallel arms adapted to be inserted through spaced openings of a wheel and a hub member, a yoke connecting said arms at one end, a shoulder on each arm adapted to abut against the edges of the opening of the wheel through which said arm is inserted, the faces of said shoulders presented towards the free ends of the arms being convex.

5. A device of the type described comprising a pair of spaced arms adapted to be inserted through the spaced openings of a wheel and hub member, and a yoke connecting said arms at one end, said arms being shaped at the opposite ends to conform to the shape of the fastening used to secure said wheel and hub together, whereby when shoved home, the alignment of all of the fastening openings of the wheel and the hub is attained.

6. A pilot bar for mounting the wheels of motor vehicles upon their hub comprised by a lever, one end of which is adapted to be inserted through a bolt opening in the wheel and engaged upon the hub as a fulcrum, and an intermediate section of which is enlarged to a dimension greater than said bolt opening, whereby the wheel will not slide against the hand of the operator when the lever is inclined in the act of mounting the wheel.

7. A pilot bar for mounting the wheels of motor vehicles upon their hub comprised by a lever having a substantially cylindrical end adapted to fit an opening in a wheel hub, and a shoulder beyond said cylindrical portion adapted to fit the edges of a bolt opening in a wheel whereby when the end of the bar is thrust through the wheel opening into a hub opening, the wheel may be raised to proper position and aligned by the engagement of the fitting parts.

8. A pilot bar for mounting the wheels of motor vehicles upon their hub comprised of a lever having a hub-engaging end of substantially the diameter of a hub opening which constitutes a fulcrum for the lever, and a sharply tapering extension from said end adapting the lever to engage within the hub opening to a substantial extent when the lever is inclined to the hub axis, and to further the projection of the fitting end of the lever into the opening.

9. A device of the type described comprising a lever having an end adapted to engage upon a wheel hub as a fulcrum, and having a shoulder intermediate its ends provided with a surface facing the fulcrum end adapted to fit those edges of the openings in a wheel by means of which the wheel is aligned upon the hub, whereby when the wheel is raised to position and the lever forced home, it may be aligned upon the hub by the lever.

10. A pilot bar for mounting the wheels of motor vehicles upon their hub, having a fulcrum end adapted to be thrust through registering fastening apertures of the wheel and hub respectively, and shaped substantially to the form of the fastening means which is used to secure said wheel and hub together.

11. A tool for mounting automobile wheels consisting of a plurality of leg portions so spaced as to be adapted to enter a like number of wheel and hub bolt holes, as and for the purpose specified.

12. A tool for mounting automobile wheels consisting of two leg portions so spaced as to be adapted to enter a like number of wheel and hub bolt holes, as and for the purpose specified.

13. A substantially U-shaped tool for mounting automobile wheels comprising two leg portions spaced apart such distance that they are adapted to enter two spaced bolt holes of an automobile wheel and hub, as and for the purpose specified.

14. A relatively long substantially U-shaped tool for mounting automobile wheels comprising two leg portions spaced apart such distance that they are adapted to enter two spaced bolt holes of an automobile wheel and hub, as and for the purpose specified.

In testimony whereof, I affix my signature.

EMIL A. NELSON.